(12) United States Patent
Nyce

(10) Patent No.: US 7,135,855 B2
(45) Date of Patent: Nov. 14, 2006

(54) SIMPLIFIED INDUCTIVE POSITION SENSOR AND CIRCUIT CONFIGURATION

(76) Inventor: David Scott Nyce, 2633 Whistling Quail Run, Apex, NC (US) 27502

( * ) Notice: Subject to any disclaimer, the term of this patent is extended or adjusted under 35 U.S.C. 154(b) by 117 days.

(21) Appl. No.: 10/847,500

(22) Filed: May 17, 2004

(65) Prior Publication Data

US 2005/0253576 A1   Nov. 17, 2005

(51) Int. Cl.
*G01B 7/14* (2006.01)
*H01F 5/00* (2006.01)

(52) U.S. Cl. .......................... 324/207.16; 324/207.24; 324/207.25

(58) Field of Classification Search ........... 324/207.17, 324/207.22–207.25, 207.13, 207.15, 207.18, 324/207.16
See application file for complete search history.

(56) References Cited

U.S. PATENT DOCUMENTS

| | | | | |
|---|---|---|---|---|
| 2,341,346 A | * | 2/1944 | Summerhayes, Jr. | 330/124 R |
| 4,613,843 A | * | 9/1986 | Esper et al. | 336/232 |
| 4,663,589 A | * | 5/1987 | Fiori, Jr. | 324/207.16 |
| 4,777,436 A | * | 10/1988 | Fiori, Jr. | 324/207.17 |
| 4,851,770 A | * | 7/1989 | Fiori, Jr. | 324/207.16 |
| 5,079,523 A | * | 1/1992 | Kleinhans | 331/65 |
| 5,175,497 A | * | 12/1992 | Dobler et al. | 324/207.25 |
| 5,204,621 A | * | 4/1993 | Hermann et al. | 324/207.18 |
| 5,248,938 A | * | 9/1993 | Kobayashi et al. | 324/207.16 |
| 5,402,096 A | * | 3/1995 | Harris | 336/130 |
| 5,475,302 A | * | 12/1995 | Mehnert et al. | 324/207.17 |
| 5,682,097 A | * | 10/1997 | Bryant et al. | 324/207.17 |
| 6,348,791 B1 | * | 2/2002 | Shattil | 324/225 |
| 6,483,295 B1 | * | 11/2002 | Irle et al. | 324/207.17 |
| 6,541,960 B1 | * | 4/2003 | Nekado | 324/207.15 |
| 6,605,939 B1 | * | 8/2003 | Jansseune et al. | 324/207.16 |
| 6,642,710 B1 | * | 11/2003 | Morrison et al. | 324/207.12 |
| 6,756,779 B1 | * | 6/2004 | Gleixner et al. | 324/207.17 |
| 2001/0052771 A1 | * | 12/2001 | Jagiella | 324/207.16 |
| 2003/0151402 A1 | * | 8/2003 | Kindler | 324/207.17 |

* cited by examiner

*Primary Examiner*—Edward Lefkowitz
*Assistant Examiner*—Kenneth J. Whittington

(57) ABSTRACT

Inductive position sensors and circuit configurations are disclosed for the measurement of linear, rotary, or curved position along a motion axis. The simplified sensor structures combine one or two parts of a movable core element with a simple planar substrate having first and second inductances connected in series. Movement of the core element in parallel to the planar substrate causing the impedance of at least one of the inductances to change. Simple circuit configurations are taught by which the impedance change is converted into a useful output signal that indicates position along the motion axis.

14 Claims, 10 Drawing Sheets

SIMPLIFIED INDUCTIVE POSITION SENSOR AND CIRCUIT CONFIGURATION

BACKGROUND OF THE INVENTION

1. Field of the Invention

The present invention relates to sensors and transducers for the measurement of position. The measured position is typically that of a linear or rotary motion; alternatively, the motion may take the form of a curved path. The position measuring element, also called the primary sensor or the sensing element, is herein called the sensor. The sensor translates the measurand into a usable electrical signal called the sensor output. The present invention teaches a non-contact sensor comprising stationary and movable component parts, the measurement being the position of the movable part, called the movable element, with respect to the stationary part, called the stationary element. A driver circuit drives the sensor, and a signal conditioning circuit converts the sensor output into a standard electrical signal transducer output, such as zero to ten volts DC. An electronics module comprises the driver and signal conditioning circuits. The combination of the sensor, electronics module, housing and other components together form a functional position sensing device, called the transducer.

The present invention relates to a novel configuration of an inductive type of position sensor and associated electronic circuits. The present invention teaches an absolute, non-contact sensor and transducer, but alternatively, relative measurements can be derived from the absolute position data by storing and subtracting data, as is well known in the art.

More particularly, the present invention relates to an inductive position transducer having a sensor that measures the relative position of a conductive or ferromagnetic movable element, comprising one or more parts, with respect to a stationary element that includes at least two inductors. The path over which the position is measured is called the motion axis.

A position change of the movable element results in associated changes in the inductances of the inductors. The inductance changes are indicated through the use of an electronic circuit that responds to the resulting changes in impedance of the inductors.

2. Description of the Prior Art

Prior art inductive linear and rotary position sensors and transducers have disclosed a plurality of planar circuit boards onto which are disposed spiral conductive structures. Brosh, in U.S. Pat. No. 4,253,079, teaches a displacement sensor in which an array of such planar circuit boards are stacked, approximating the configuration of the well known LVDT (linear variable differential transformer). The spiral conductive structures each manifest a central hole, through which a magnetic core is disposed, whereby motion of the magnetic core results in variation of the coupling between primary and secondary windings of the spiral conductive structures.

Brosh, in U.S. Pat. No. 4,507,638, teaches a rotary sensor formed of first and second planar circuit boards onto which four flat coils are disposed and arranged at ninety degree intervals. A rotatable plate capable of blocking a magnetic field is positioned between the first and second planar circuit boards and rotates about an eccentric axis. The assembly generates sine and cosine electrical outputs as the plate is rotated.

Fiori, in U.S. Pat. No. 4,777,436, teaches a rotary sensor having first and second planar metal coils, not connected in series, attached to a first insulating board, and third and fourth planar coils, not connected in series, attached to a second insulating board, and a rotating planar metal member disposed between the first and second insulating boards. A first inductance is formed by series connection of the first and third coils, and a second inductance is formed by series connection of the second and fourth coils.

Each of these prior art methods utilizes a sensing element having coils formed on more than one planar circuit board, and requires complex circuitry in order to develop a useful position output electrical signal. Using multiple planar circuit boards, and the required interconnections, also leads to higher cost and labor than designs according to the present invention.

BRIEF SUMMARY OF THE INVENTION

Both the prior art inductive position sensors and transducers, and the present invention, provide for the non-contact measurement of position. It is an object of the present invention, in contrast to the prior art, to provide a novel method for measuring position that combines a simple flat structure of conductors to form the inductive sensing element, together with a simple and inexpensive electronic circuit to drive the sensor and provide a useful electrical output.

The novel method avoids problems associated with interconnecting more than one set of planar coils, as well as the cost of the complicated circuitry normally used to produce a transducer electrical output. In addition, the sensor and circuits of the present invention are easily configurable to support linear, rotary, or curved path position measurement.

A preferred embodiment of the present invention teaches first and second conductor coils disposed on a stationary planar insulating member, essentially parallel to which is disposed a movable member that is formed of an electrically conductive or magnetically permeable material that moves in the motion axis while maintaining essentially parallel alignment with the stationary member. The first and second conductor coils are connected in series and driven by an alternating electrical circuit. The first and second conductor coils form first and second impedances. As the movable member moves along the motion axis, the magnitudes of the first and second impedances are affected. The series connection of the impedances acts as a voltage divider, providing a variable AC voltage at the interconnection point. A demodulator section of the electronic circuit converts this variable AC voltage into a DC signal voltage that varies with the measurand.

To reduce errors that may occur due to mechanical misalignment, forming of the movable member as two interconnected parts is also taught. In this case, one part is disposed on each of the two sides of the planar insulating member. This same two-part configuration of the movable member also results in less sensitivity to changes in ambient temperature, due to the tendency of the two coils to undergo similar changes and cancel out temperature-induced errors.

DETAILED DESCRIPTION OF THE INVENTION

Figure 3:
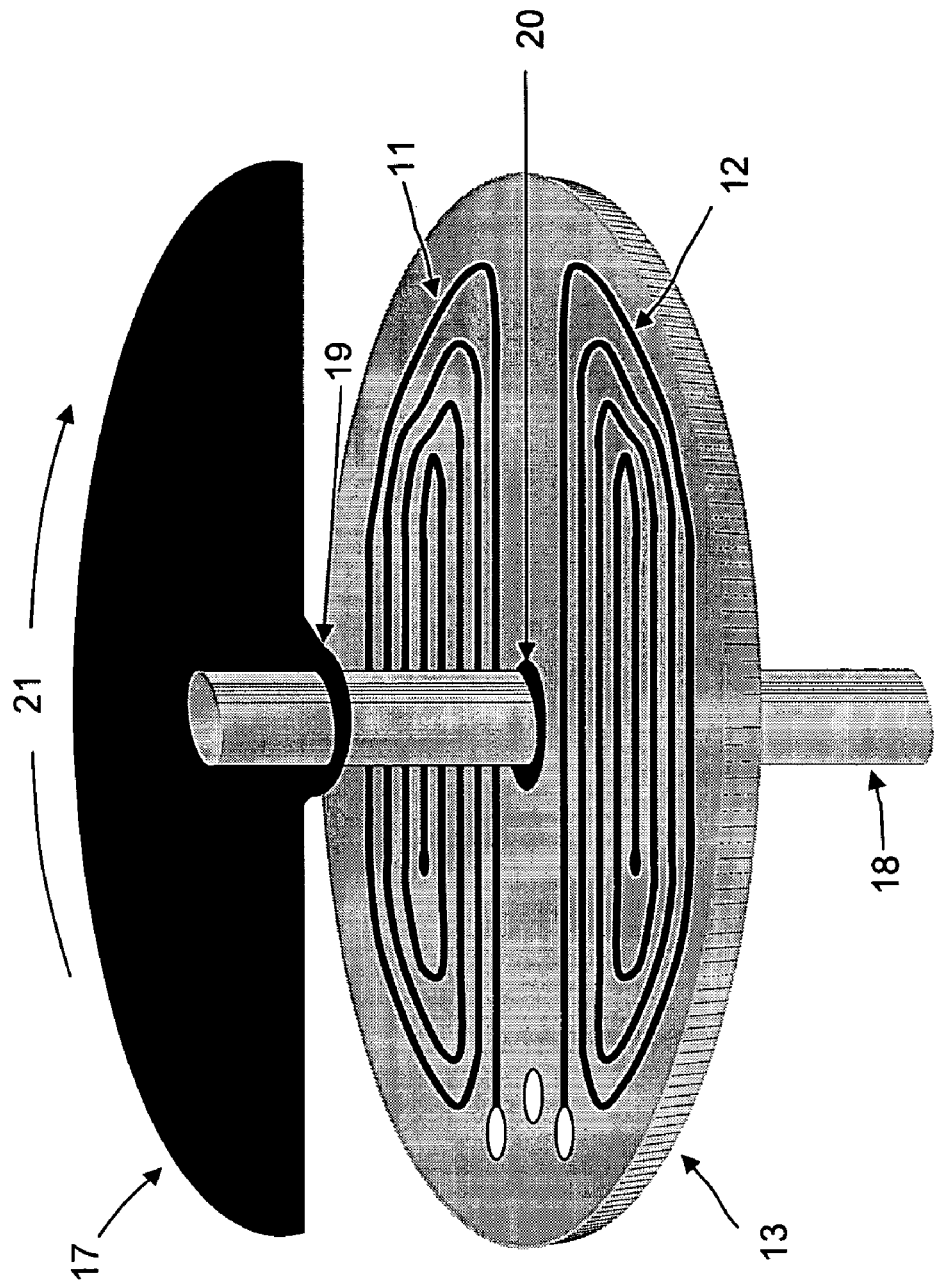
FIG. 3 shows the mechanical arrangement of a rotary sensor according to the present invention, with shaft 18 extending through hole 20 in rotary stationary planar insulating member 13 and then attached to rotary movable member 17 at attachment point 19. Rotary movable member 17 moves along an arc forming rotary motion axis 21.

A first preferred embodiment of the present invention is shown in FIG. 3, and enables the measurement of rotary motion with the minimum of complexity in both the sensor and the associated electronic circuit. Together with the circuit of FIG. 1, a complete transducer can be constructed with a bare minimum of components, thus providing a simple and inexpensive transducer. As rotary movable member 17 moves along rotary motion axis 21, the impedance of coils 11 and 12 change in response to the measured position along motion axis 21. The movable member is fabricated from a ferromagnetic material, such as a nickel-iron alloy. Alternatively, it can be fabricated from an electrically conductive non-magnetic material, such as aluminum. With a ferromagnetic movable member, the coil impedance changes with position of the movable member due to the permeability of the ferromagnetic material, since the inductance and therefore the impedance of a coil varies approximately in direct proportion with magnetic permeability. With an electrically conductive movable member, the coil impedance changes due to eddy currents that flow in the movable member from electromagnetic induction. The production of eddy currents is more effective at higher frequencies, so operating frequencies of 100 kHz or more are preferred when operating in this mode. When using a ferromagnetic material movable member at such high frequencies, it is preferred to use a laminated material or a composite such as a ferrite. This reduces eddy currents when the effect of permeability is the preferred mode, rather than that of inducing eddy currents.

When a ferromagnetic movable member is fully aligned over coil 11, as shown in FIG. 3, a first impedance 5, of coil 11, is at a maximum, while a second impedance 6, of coil 12, is at a minimum. In this condition, the output at pin 9 is at its minimum voltage. When a ferromagnetic movable member is directly over coil 12, the output at pin 9 is at its maximum voltage. For each angle of rotation in between these two outputs, there is an output corresponding to the angle, yielding a total rotational position measuring range of 180 degrees for the configuration shown in FIG. 3. It is not required that a rotary position sensor according to the present invention must use a coil shape covering 180 degrees of rotation. Coils of other angular dimension can be used. For example, a coil size in which each coil covers a rotation angle of 90 degrees, instead of the 180 degrees of FIG. 3, can be used.

Figure 4:
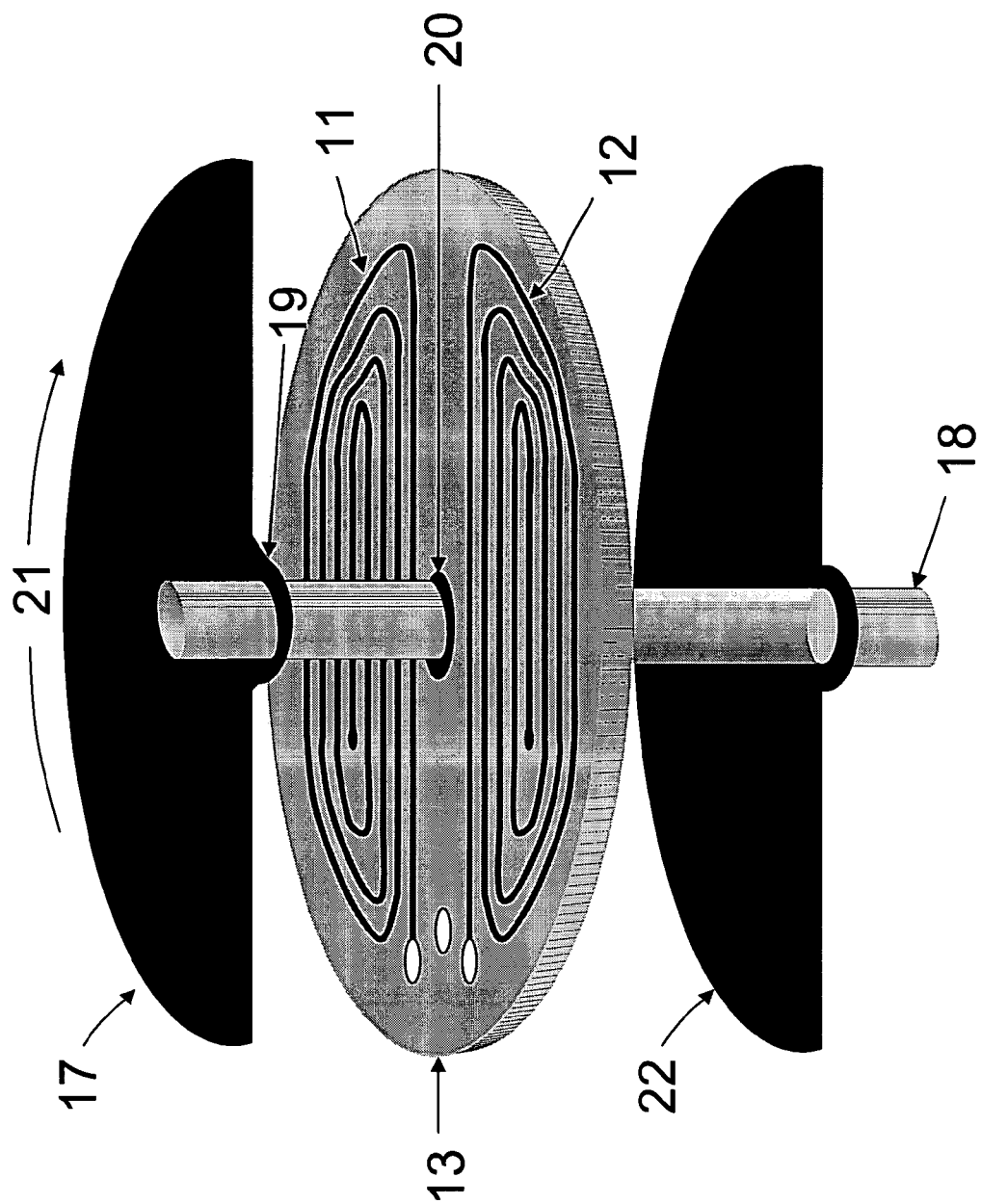
FIG. 4 shows the same sensor configuration as FIG. 3, except that member 22 is shown as an additional part of rotary movable member 17.
Figure 5:
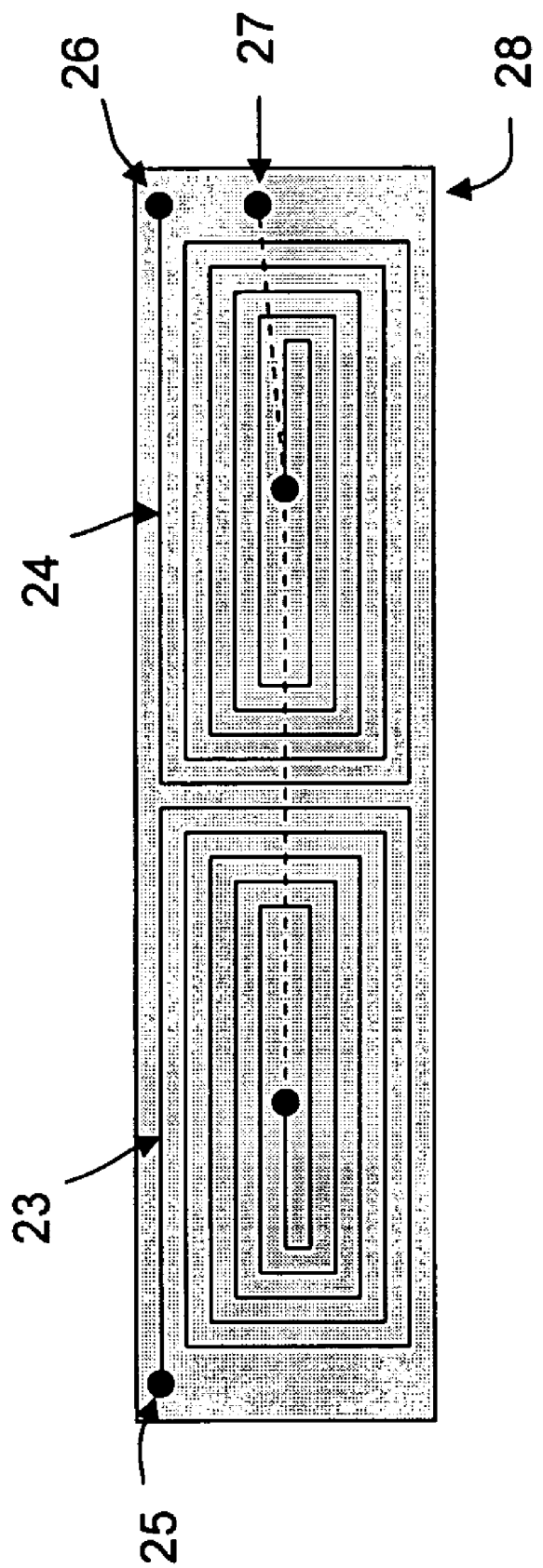
FIG. 5 shows a configuration of first and second linear sensor conductor coils 23 and 24 attached to planar insulating linear stationary member 28, with coil interconnection pin 27, first coil pin 25 and second coil pin 26.

In a second preferred embodiment, according to FIG. 4, a rotary sensor is formed as in FIG. 3, with the addition to rotary movable member 17 of a second part, 22. Disposing the two parts of the movable member so that the first part, 17, is above stationary member 13, and the second part, 22, is below rotary stationary member 13, yield an improved performance over the single part movable member shown in FIG. 3. The improvement is that the output at pin 9 of the circuit of FIG. 1 remains relatively unchanged when the shaft 18 is allowed to move up and down or to wobble. In this case, any movement of movable member first part, 17, toward or away from rotary stationary member 13 is compensated by a corresponding movement of movable member second part 22 away or toward, respectively, rotary stationary member 13. Likewise, temperature-induced changes in the impedance of coils in rotary stationary member 13 are compensated due to a similar effect being introduced into each coil.

Figure 7:
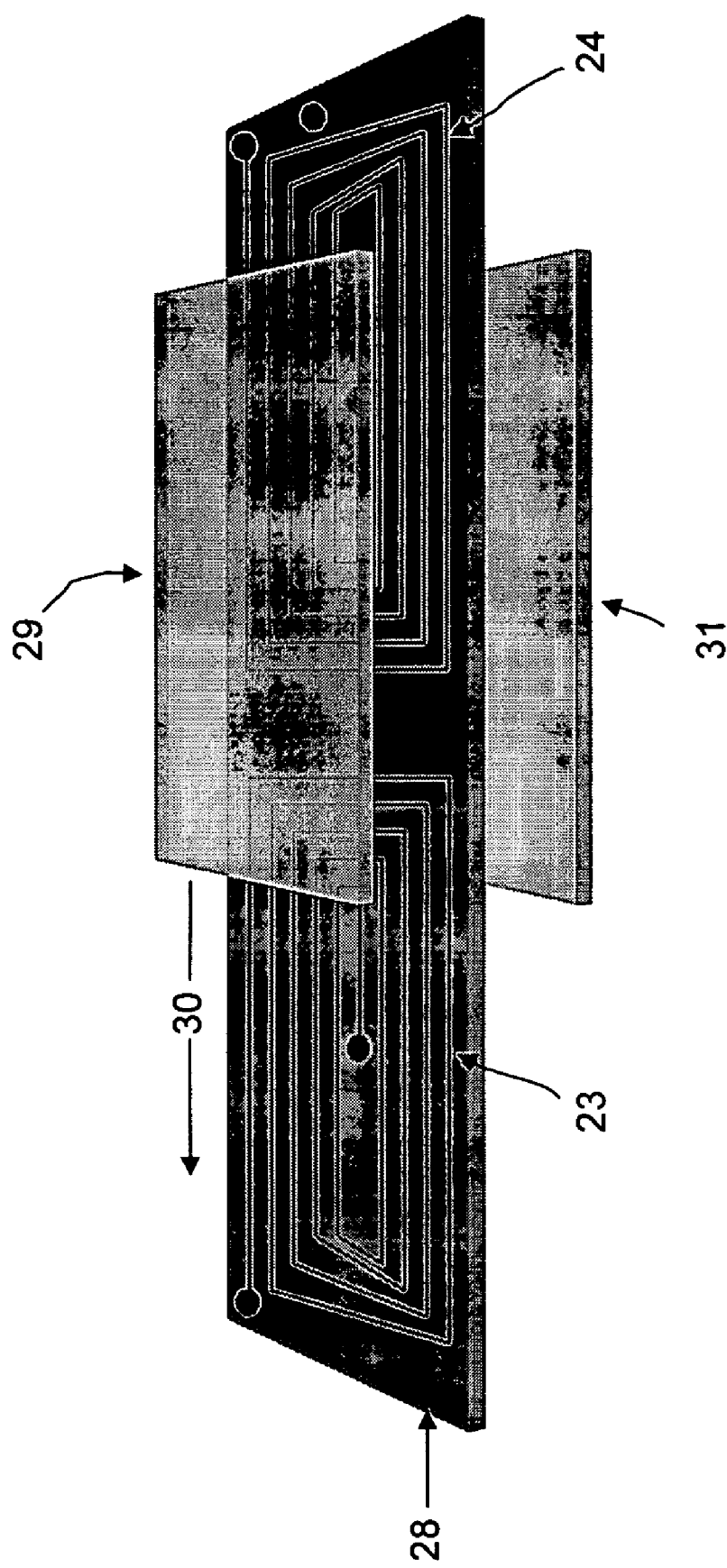
FIG. 7 shows the same sensor configuration as FIG. 6, except that member 31 is shown as an additional part of linear movable member 29.

A third preferred embodiment is shown in FIG. 7, in which a linear position sensor is formed by the movement of linear movable member 29, and its second part, member 31, along motion axis 30. When a ferromagnetic linear movable member 29 and movable member 31 are aligned with coil 24, the inductance of that coil and its impedance are maximum, while those of coil 23 are minimum. As the movable element parts move into alignment with coil 23, the impedance of coil 24 reduces, as that of coil 23 increases. This causes the output voltage on pin 9 of FIG. 1 to increase as the movable element moves along motion axis 30 in the direction shown in FIG. 7.

Figure 1:
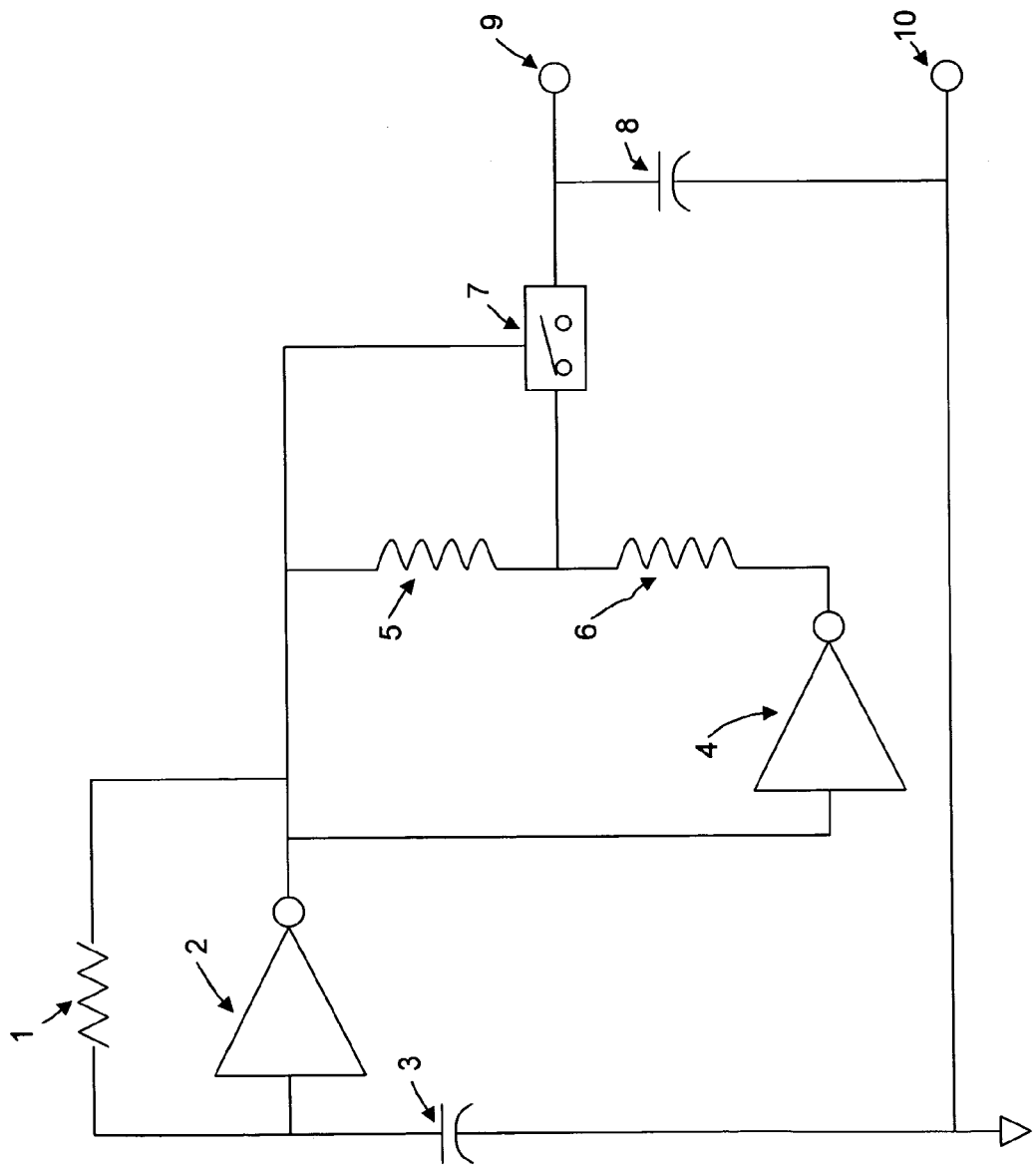
FIG. 1 shows a circuit diagram where resistor 1 and capacitor 3 work together with inverting schmitt trigger 2 to form an oscillator circuit, well know in the art, that oscillates at a frequency dependent on the values of resistor 1 and capacitor 3. The oscillating output voltages of inverting schmitt triggers 2 and 4 drive the series connection of first and second impedances 5 and 6, that are formed by the two coils of the sensor. The operation of bilateral switch 7, is controlled by the output of inverter 2 to demodulate the AC voltage appearing at the junction between impedances 5 and 6. A DC signal voltage appears across filter capacitor 8 that varies with the ratio between impedances 5 and 6. The signal output appears across output pin 9 and circuit common 10.
Figure 2:
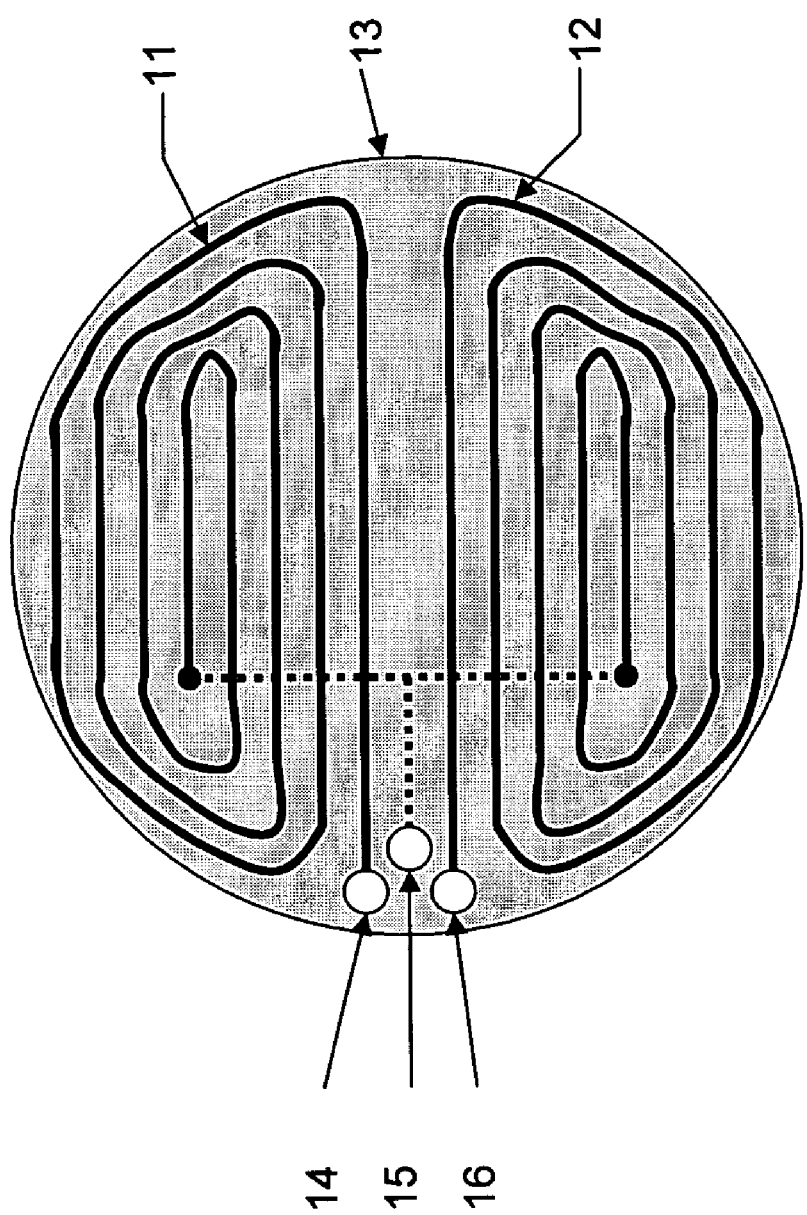
FIG. 2 shows first and second rotary sensor conductor coils 11 and 12 connected in series and attached to planar insulating rotary stationary member 13. Pin 15 is the interconnection point of coils 11 and 12. Pins 14 and 16 are the remaining connection points of coils 11 and 12, respectively. Coils 11 and 12 form the respective impedances 5 and 6 that are shown in FIG. 1.
Figure 8:
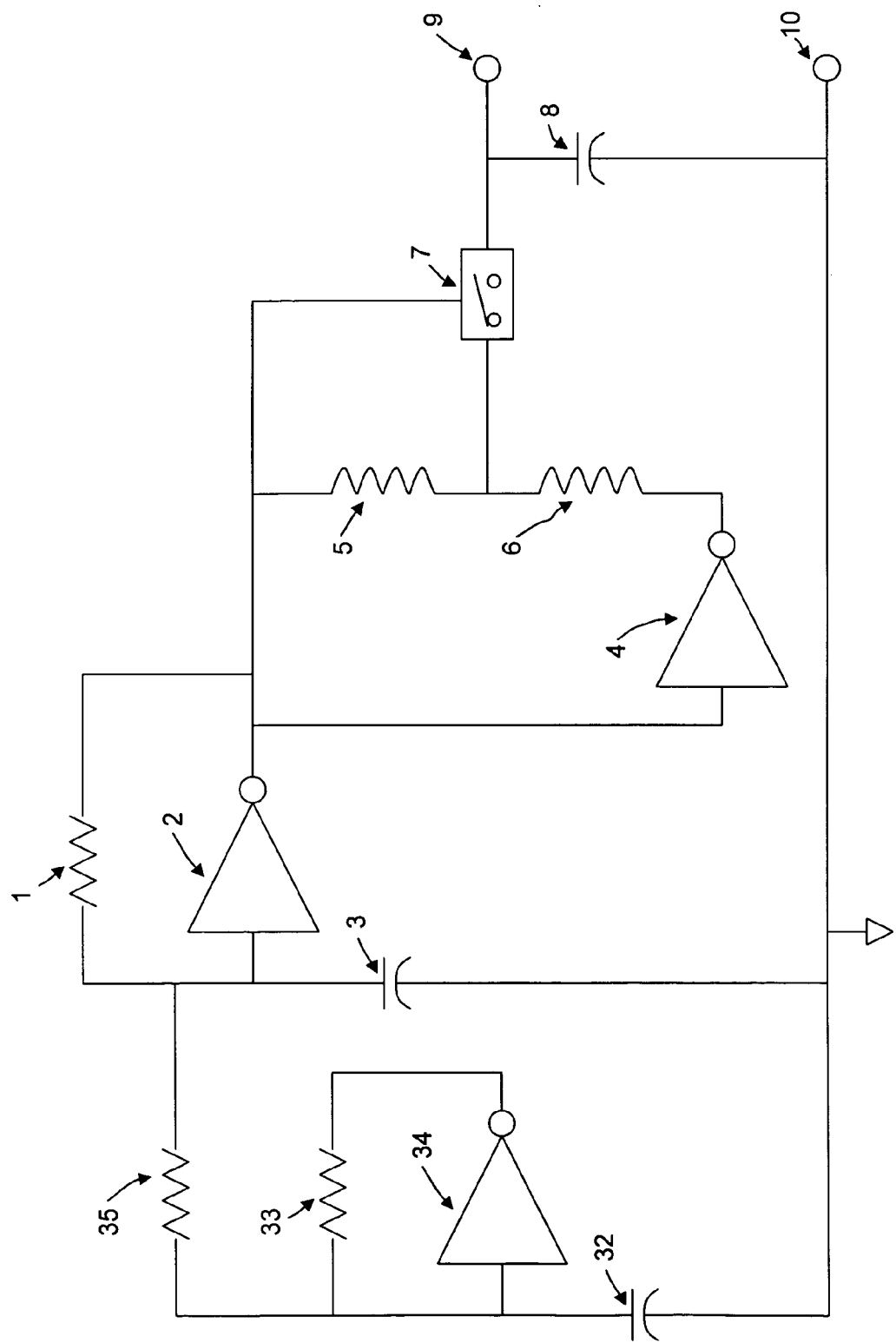
FIG. 8 shows the same circuit as in FIG. 1, with the addition of an oscillator comprising schmitt trigger 34, capacitor 32, and resistor 33. Resistor 35 connects to the oscillator of schmitt trigger 2 in a way to add variation to the schmitt trigger 2 oscillation frequency.

Alternatively, in any of the preferred embodiments, the circuit of FIG. 8 can be used instead of that in FIG. 1. The output of oscillator 32, 33, 34 (called the control oscillator) is connected to oscillator 1, 2, 3 (called the drive oscillator) through resistor 35. The drive oscillator drives the sensing element at a frequency, for example 1 MHz. The control oscillator causes a relatively small variation in the frequency of the drive oscillator, typically on the order of two percent, or less, of the drive frequency; for example, a variation of 10 KHz. This percentage is adjusted through the resistance value of resistor 35. The frequency of the control oscillator is typically on the order of less than one percent of the frequency of the drive oscillator, for example 1 KHz. The reciprocal of this frequency is the scan rate, and is adjusted through the value of resistor 33 or capacitor 32. So, in the example, the frequency of the 1 MHz drive oscillator will vary by 20 KHz at a scan rate of 1 KHz. The advantage of this is to reduce the concentration of energy into any one frequency, thus making it easier to remain within the requirements of standards for limiting electromagnetic radiation. Instead of using the control oscillator of FIG. 8, a control signal from another source can be used to vary the frequency of the drive oscillator.

Figure 6:
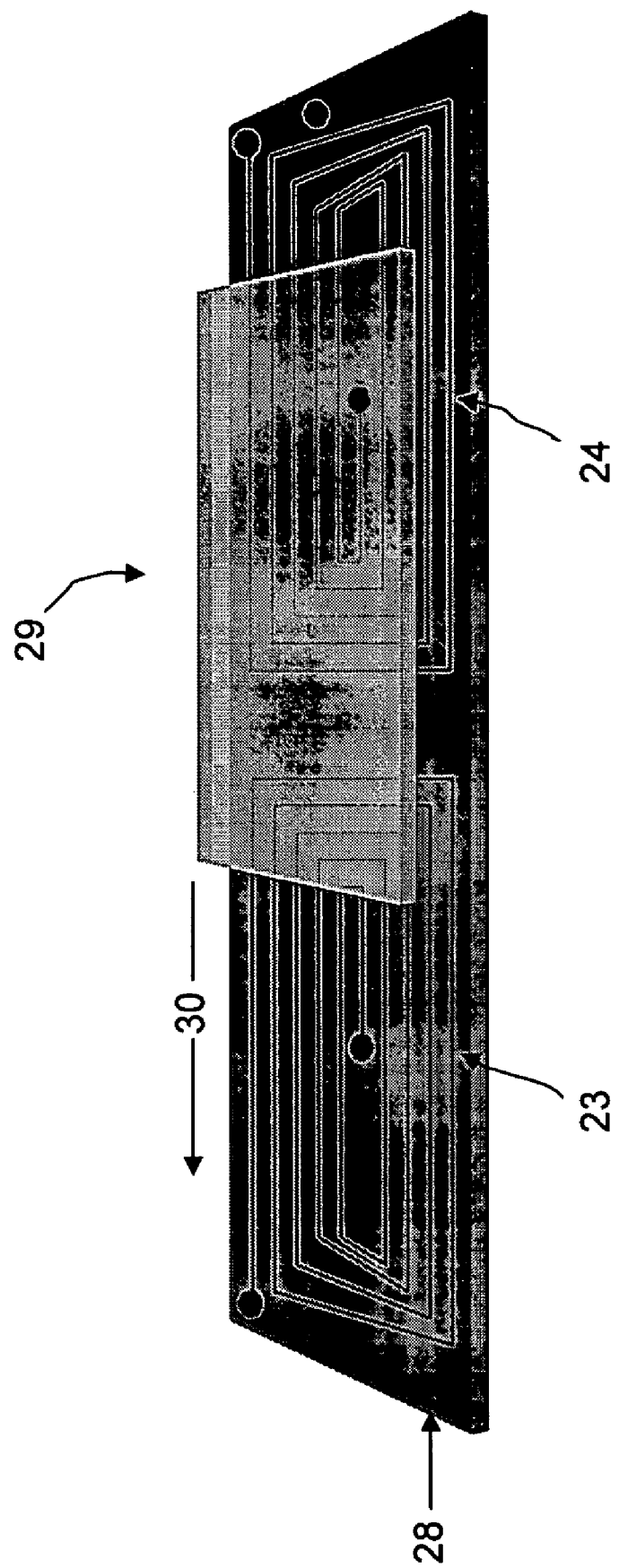
FIG. 6 shows the mechanical arrangement of a linear sensor according to the present invention, with linear movable member 29 positioned above planar insulating linear stationary member 28, with linear movable member 29 moving along linear motion axis 30.
Figure 9:
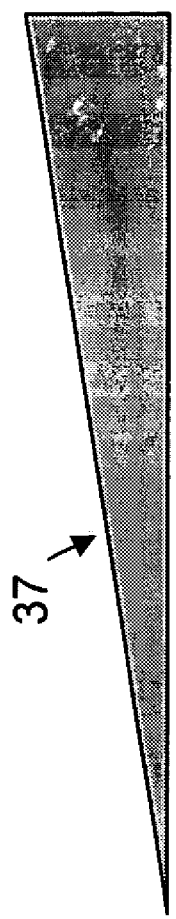
FIG. 9 shows examples of other shapes for the movable member of a position sensor according to the present invention. The arc shape of shaped rotary movable member 36 is suited to use in a rotary sensor for changing the rotation angle vs. output function, likewise, the sloped shape of shaped linear movable member 37 is suited to similar use in a linear sensor.
Figure 9:
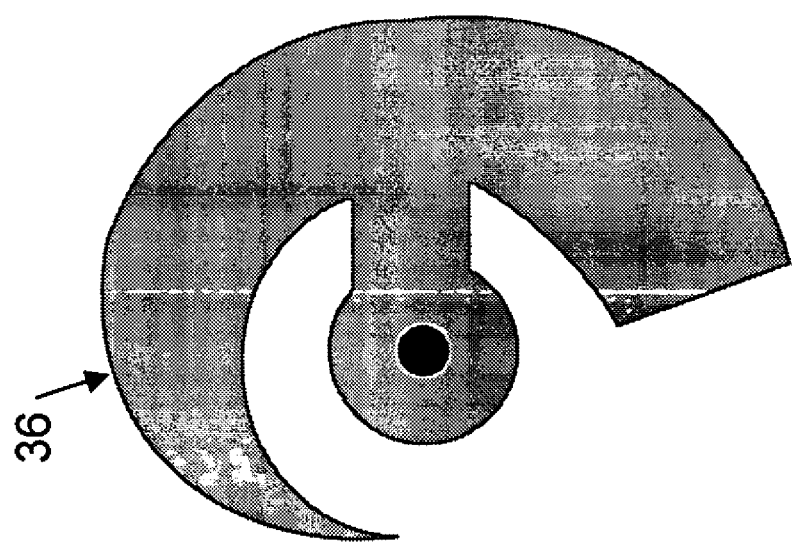

Alternative shapes can also be used for a movable member. Examples are shown in FIG. 9. Shapes such as movable members 36 and 37 serve to modify the output function vs. measurand in two ways. The first way is to extend the measurement range for a given coil size. For example, by substituting a movable member shape as in 37 to replace 29 in FIG. 6, the length of motion axis 30 can be increased. In some cases, the inductance of both coils may be increasing at the same time, but one increases faster than the other. So, this function still results in a monotonic output on pin 9 in the circuit of FIG. 1. The same applies to increasing the range of a rotary sensor to more than the 180 degrees shown in FIG. 3, by using a shape such as that of 36 in FIG. 9.

The second way in which the sensor output function can be modified by shaping the movable member, is to change the shape of the transfer function of output vs. measurand. For example, the movable member 36 can be used instead of the movable member 17 of FIG. 3, with a given set of coils 11 and 12. In this case, the transfer function of sensor output vs. movement along the motion axis will change and this can be used to tailor the sensor transfer function as desired, for example: in the reduction of nonlinearity error.

Figure 10:
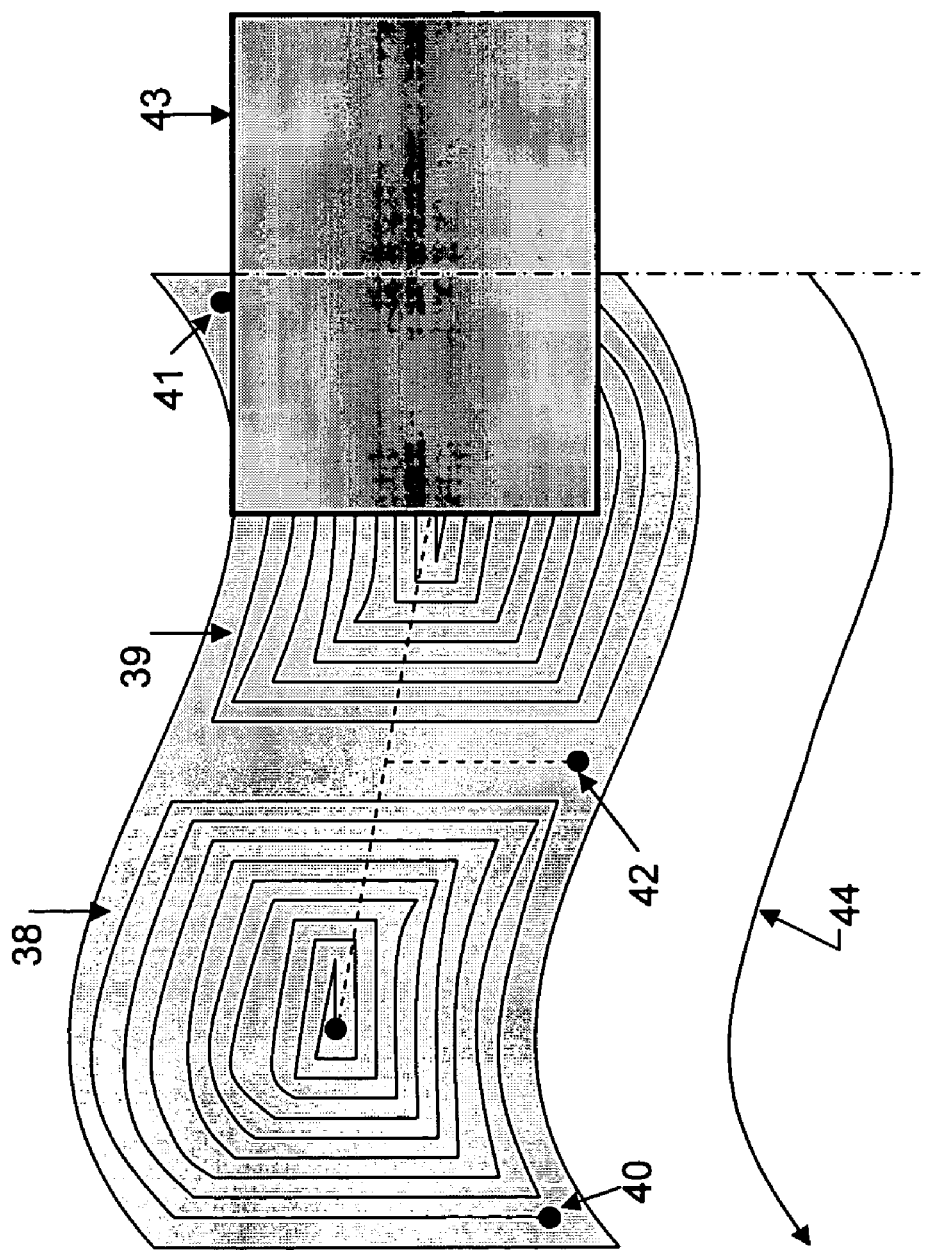
FIG. 10 shows an example of a sensor configuration, according to the present invention, that measures motion along a nonlinear motion axis 44. First conductor coil 38 is connected in series with second conductor coil 39, with the interconnection point being brought out on pin 42. The remaining coil connections are brought out on pins 40 and 41. Movable member 43 follows the nonlinear motion axis 44.

In addition to linear and rotary sensors, the present invention also teaches the use of similar movable and stationary member configurations to implement sensors with a nonlinear motion axis shape. An example is shown in FIG. 10. Coils 38 and 39 are shaped to conform to the desired nonlinear motion axis 44. The coils are connected to a circuit such as that of FIG. 1. As movable element 43 is moved along the nonlinear motion axis 44, the output at pin 9 of the circuit of FIG. 1, changes in response to the movement.

For simplicity, FIGS. 2 through 7 and FIG. 10 show the inductor coils each as a single conductor pattern layer on the top of a flat dielectric material substrate, such as a printed circuit board. As it is well known in the art, a printed circuit board can be fabricated as having one or more layers of a conductor pattern in addition to the initial layer. In some cases, such additional layers are used in accordance with the present invention for the purpose of increasing the inductance of a sensing coil for a given surface area, and thus the impedance of that coil at a given frequency of operation. For example, coils 11 and 12 can be fabricated in a four layer printed circuit board, with each additional conductor layer positioned below the previous layer of the respective coil. Coil 11 would have four layers and coil 12 would have four layers, all included within one simple printed circuit board according to popular manufacturing methods well known in the art. According to the present invention, the two resulting coils would be connected together in series and form impedances as in 5 and 6 of FIG. 1.

I claim:

1. A device for the measurement of position along a linear, rotary, or curved motion axis, the device comprising a sensing element, a core assembly, and a drive oscillator, the drive oscillator driving the sensing element with an alternatine current at a variable frequency, the sensing element comprising at least one electrically nonconductive substrate and at least two planar conductor patterns, the conductor patterns forming at least two inductances, at least two of the inductances connected together in series, the core assembly comprising at least one electrically conductive or ferromagnetic structure, the structure moving essentially in parallel to a surface of the substrate such that it becomes more aligned over a given conductor pattern as a measured position varies along the motion axis, at least one structure shaped to cause a variation in the inductance of the conductor pattern over which it is more closely aligned, the magnitude of at least one inductance providing an informative signal that is indicative of the measured position.

2. A device as in claim 1 wherein the core assembly moves essentially in an arc, the structure becoming more aligned over a first conductor pattern as it becomes less aligned over a second conductor pattern, such alignment of the structure causing a first variation in the inductance of the first conductor pattern over which it is more closely aligned and causing a second variation in the inductance of the second conductor pattern over which it is less closely aligned, the first and second conductor patterns connected together in series, one of the first and second variations being an increase in inductance, and the other variation being a decrease in inductance.

3. A device as in claim 1 wherein the core assembly moves essentially in a straight line, the structure becoming more aligned over a first conductor pattern as it becomes less aligned over a second conductor pattern, such alignment of the structure causing a first variation in the inductance of the first conductor pattern over which it is more closely aligned and causing a second variation in the inductance of the second conductor pattern over which it is less closely aligned, the first and second conductor patterns connected together in series, one of the first and second variations being an increase in inductance, and the other variation being a decrease in inductance.

4. The device of claim 1, the drive oscillator driving the sensing element with an alternating current having a sufficiently high frequency such that an eddy current is induced to flow within at least a portion of the core assembly, the electronics module receiving the informative signal and producing an electrical output indicative of the measured position.

5. The device of claim 1, the drive oscillator operating at a first frequency, the control signal operating at a second frequency, the control signal connected to the drive oscillator and acting to cause variation in the first frequency such that the first frequency varies between an upper limit and a lower limit, the difference in frequencies between the upper and lower limits defining a range of variation, the energy of the drive oscillator thereby being dispersed over the range of variation.

6. The device of claim 1, wherein the sensing element is formed of one planar, electrically nonconductive substrate onto which are formed two conductor patterns, the conductor patterns forming two inductances, the two inductances connected together in series, the structure being movable to become more aligned over a first conductor pattern as it becomes less aligned over a second conductor pattern, such alignment of the structure causing a first variation in the inductance of the first conductor pattern over which it is more closely aligned and causing a second variation in the inductance of the second conductor pattern over which it is less closely aligned, one of the first and second variations being an increase in inductance, and the other variation being a decrease in inductance.

7. The device of claim 6, the core assembly comprising two electrically conductive or ferromagnetic structures, the substrate having essentially two sides, one structure disposed proximate one side of the substrate, and the other structure disposed proximate the remaining side of the substrate.

8. A transducer for measuring linear, rotary, or curved position along a motion axis, the transducer comprising a sensing element, a core assembly, and an electronics module, the electronics module including a drive oscillator, the drive oscillator driving the sensing element with an alternating current at a variable frequency, the sensing element formed of one planar, electrically nonconductive substrate and at least two conductor patterns, the conductor patterns forming two inductances, the two inductances connected together in series, the core assembly having at least two one electrically conductive or ferromagnetic structures that moves with respect to the sensing element in response to changes in position along the motion axis, the electronics module driving the sensing element at a sufficiently high frequency to induce an eddy current to flow within the core assembly, the electronics module receiving a signal from the sensing element, the signal being informative of a measured position, the electronics module providing an electrical output indicative of the measured position along the motion axis.

9. The transducer of claim 8 wherein the core assembly is movable essentially in an arc, position of the core assembly affecting magnitudes of first and second inductances, movement of the core assembly causing the first inductance to change and the second inductance to change in the opposite direction as the core assembly is moved closer to the conductor pattern forming the second inductance.

10. The transducer of claim 8 wherein the core assembly is movable essentially in a straight line, position of the core assembly affecting magnitudes of first and second inductances, movement of the core assembly causing the first inductance to change and the second inductance to change in the opposite direction as the core assembly is moved closer to the conductor pattern forming the second inductance.

11. A position sensor for measuring position along a motion axis, the sensor comprising a planar sensing element, a drive oscillator and a core assembly, the sensing element comprising one electrically nonconductive substrate and at least two planar conductor patterns, the substrate having first and second sides, the conductor patterns forming first and second inductances connected together in series, the inductances each having an inductive reactance, the core assembly having electrically conductive or ferromagnetic first and second parts that move one with the other and with changes in the measured position along the motion axis, the core assembly first part disposed proximate the first side of the substrate, the core assembly second part disposed proximate the second side of the substrate, the inductance of at least one conductor pattern changing in response to the approach of the core assembly such that a surface of the core assembly is more closely aligned with the conductor pattern, the drive oscillator driving the sensing element with an alternating current at a variable frequency.

12. The sensor of claim 11, wherein the core assembly is movable essentially in an arc, position of the core assembly affecting magnitudes of the first and second inductances, movement of the core assembly causing the first inductance to increase as the second inductance decreases, the first and second inductances having impedances, the impedances forming an alternating current voltage divider, the divided voltage being demodulated into a direct current, the voltage of the direct current being indicative of the position of the core assembly.

13. The sensor of claim 11 wherein the core assembly is movable essentially in a straight line, position of the core assembly affecting magnitudes of first and second inductances, movement of the core assembly causing the first inductance to increase as the second inductance decreases, the first and second inductances having impedances, the impedances forming an alternating current voltage divider, the divided voltage being demodulated into a direct current, the voltage of the direct current being indicative of the position of the core assembly.

14. A device for the measurement of a physical parameter, the device having a sensing element and a drive circuit, the sensing element providing an informative signal of the measured parameter, the drive circuit providing an alternating current drive signal to the sensing element at a drive frequency, a control signal connected to the drive circuit and introducing a variation into the drive frequency, the variation having a range, a direction, and a scan rate, the range being the difference between the highest and lowest drive frequencies, the direction being increasing or decreasing in frequency, the scan rate being the frequency at which the variation changes from increasing to decreasing frequency, the range having a midpoint frequency that is halfway between the highest and lowest drive frequencies, the range being less than fifty percent of the midpoint frequency, and the scan rate being less than fifty percent of the midpoint frequency.

* * * * *